April 26, 1932. W. H. ODEN 1,855,410
RUMBLE SEAT TOP
Filed April 9, 1930 2 Sheets-Sheet 2

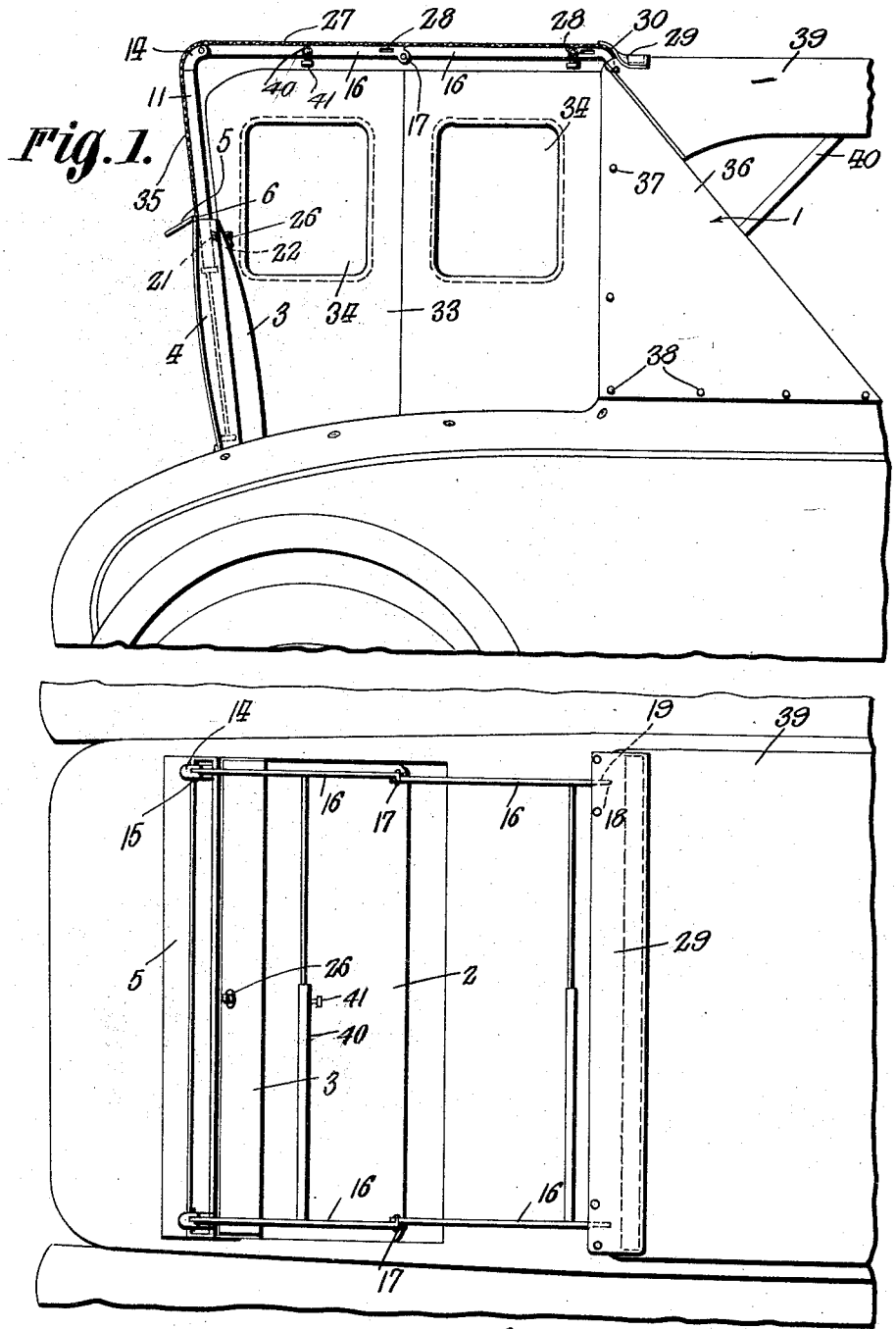

Willard H. Oden,
INVENTOR
BY Victor J. Evans
ATTORNEY

Patented Apr. 26, 1932

1,855,410

UNITED STATES PATENT OFFICE

WILLARD H. ODEN, OF RAYLAND, OHIO

RUMBLE SEAT TOP

Application filed April 9, 1930. Serial No. 442,875.

This invention relates to improvements in tops for the rumble seats of automobiles and has as one of its objects to provide a top which may be fully collapsed, when not required for use, and stored within a casing mounted upon the back of the rumble seat, the said top including a frame structure so formed as to provide for a more compact collapsing of the top to permit of its storage, in this manner.

Another object of the invention is to provide a rumble top which may be either embodied, ordinarily, in the structure of the automobile, or may be manufactured as a separate unit and readily installed upon the backs of rumble seats of different dimensions.

Another object of the invention is to so construct the rumble top that, when it is in use, rain and snow will be prevented from entering between the top and the top of the automobile proper and into the rumble seat.

Another object of the invention is to provide means whereby the members constituting the frame of the rumble seat top may be readily, compactly folded in a manner to permit of the use of side curtains provided with panes of glass or isinglass.

This invention also consists in certain other features of construction and in the combination and arrangement of the several parts to be hereinafter fully described, illustrated in the accompanying drawings, and specifically pointed out in the appended claims.

In describing my invention in detail, reference will be had to the accompanying drawings, wherein like characters denote like or corresponding parts throughout the several views, and in which:—

Figure 1 is a view partly in side elevation and partly in section illustrating the rumble seat top embodying the invention.

Figure 2 is a top plan view of the said top, the cover of the top being removed for the sake of clearness in illustrating the structure and arrangement of the said top.

Figure 3:
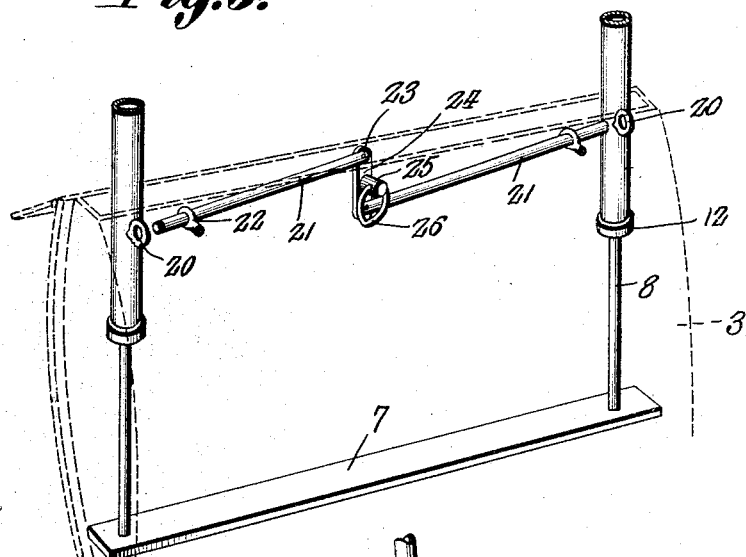
Figure 3 is a sectional perspective view in detail, illustrating the means for locking the frame in place at different elevations depending upon the height of the automobile, proper.

In the drawings the numeral 1 indicates the top of an automobile which is provided, in rear of the front seat or seats, with a rumble seat indicated by the numeral 2, the back of this seat being indicated by the numeral 3, and a sheeet metal casing 4 being secured upon the forward side of the back of the seat to house the collapsible cover structure when the same is not in use, this casing being provided at its top with a closure 5 which is hinged at its rear side adjacent the upper edge of the back of the seat as indicated by the numeral 6. The numeral 7 indicates a longitudinal rectangular supporting member which may be either of wood or metal and which is positioned in the bottom of the casing 4, and the rear side members of the cover frame consists each of an upright rod 8 which is curved at its lower end in a respective end of the supporting member 7 and which at its upper end is threaded as indicated by the numeral 9, a cylindrical nut or interiorly threaded sleeve 10 being fitted onto this end of the rod and adjustable to occupy different positions of elevation thereon. Each side upright further comprises a tubular section indicated by the numeral 11 and this section is provided at its lower end with a closure cap 12 which is threaded thereto and provided centrally with an opening 13 through which the rod 8 extends, the cylindrical nut 10 being of a diameter sufficiently less than the internal diameter of the section 11 to permit of the section 11 being slid upwardly and downwardly and guided by the said nut of the two uprights, the said nuts being of sufficient length to insure of stability of the uprights.

The numeral 14 indicates a fitting which is applied to the upper end of each section 11 and has a forwardly directed end provided with spaced ears 15 between which is pivoted the rear end of the rear one of a pair of frame bars 16 which are pivotally connected to each other at their relatively adjacent ends as indicated by the numeral 17, and in such manner that the forward one of the bars may be folded downwardly and inwardly with respect to the rear one of the bars and against the same. These pairs of connecting frame members of course extend forwardly from the upper ends of the uprights comprising the sections 8 and 11, and the forward ends of the forward sections are each provided with a downwardly curved head 18 which is designed to seat in a niche 19 formed in the corners of the top structure of the automobile proper.

In order that the vertically adjustable sections 11 of the side uprights may be held in the positions to which they are to be adjusted in order to hold the frame structure, as a whole, in full elevated position, each of the said sections 11 is formed or provided with an apertured ear 20 located a suitable distance above its lower end and locking rods 21 are slidably fitted through eyelets 22 mounted upon the rear of the rumble seat 3 and at their outer ends are engageable in the said ears, the inner ends of these rods being pivotally connected as at 23 to the upper and lower ends of a head 24 which is fixed upon a stem 25, at a point between its ends, this stem being rotatably mounted in the wall of the casing 4 and a ring 26 is suspended from the said stem 25 and will normally assume, by gravity, a suspended position, as shown in Figures 1, 2 and 3 of the drawings so as not to interfere with the occupants of the rumble seat, it being understood that by grasping the ring 26 and swinging the same to horizontal position and then rotating the same toward the left in Figure 3, the rods 21 will be shifted outwardly so as to bring their outer ends into engagement in the openings in the ears 20 thereby supporting the respective sections 11 of the side uprights in the proper elevated position, and by rotating the ring toward the right, the head 24 will be rocked or rotated so as to retract the said rods 21 and withdraw their outer ends from the openings in the ears 20. If desired, in order to adapt the structure to be mounted upon automobiles having rumble seats of different widths, the rods 21 may be formed of telescopic sections, and the sections held in positions of adjustment by means of a set screw, as is well known.

The cover for the frame structure is indicated in general by the numeral 27 and the said cover is attached at its lateral margins and at its rear portion in any suitable manner to the sections 11 of the rear uprights of the frame structure. The top of the cover 27 is led forwardly over the side members of the frame structure, and comprises the pivotally connected sections 16. In order that the top of the cover at its lateral portions, which is preferably connected with the respective frame members 16 by portions of the covering being fitted through slots 28 formed in the forward end of each section, and in order to prevent the entrance of rain and snow between the forward side of the top of the covering and the rear side of the top of the automobile proper, a shield 29 of flexible sheet material is cemented or otherwise secured transversely to the top of the automobile proper and extends rearwardly and upwardly over the forward portion 30 of the top of the covering 27.

The portion mentioned above is overturned in a downward direction over the curved head 18 at the forward ends of the front sections 16 of the side members of the frame structure, and it will be understood at this point that the extended portion 30 of the shoulder may be provided with, for example, the socket members 31 of snap fasteners and the stud members of said fasteners, which are indicated by the numeral 32 may be arranged upon the rear side of the top of the automobile proper. The numeral 33 indicates side coverings which depend from the opposite sides of the top covering 27 and panes 34 of glass or isinglass are mounted therein, and the adjacent vertical margins of these side cover sections may be suitably connected as for example by snap fasteners (not shown) so that when the top as a whole is to be collapsed, the side cover sections 33 may be folded to lie against the inner sides of the portions of the top covering 27 which are above the respective sections 33.

In collapsing the frame structure, the ring 26 is rotated so as to retract the locking rods 21 thus permitting upward shifting of the sections 11 of the side uprights and of the cover frame and permitting of disengagement of the curved heads 18 of the front sections 16 of the side members of the frame from the niches 19 whereupon these forward sections may be swung downwardly and inwardly after the side sections 33 have been folded into place, and the folded sections 16 and the portions of the top cover 27 supported thereby, and then folded to lie against the sections 11 in the position against the back covering section, which is indicated by the numeral 35 and which extends downwardly from the upper ends of the sections 11 and, normally, delivered to the open top of the casing 4, whereupon the folded frame sections and the coverings which are likewise folded may be shifted downwardly in the casing until the closure cap 12 for the lower ends of the sections 11 rest upon the supporting member 7.

Figures 4, 5, 6:
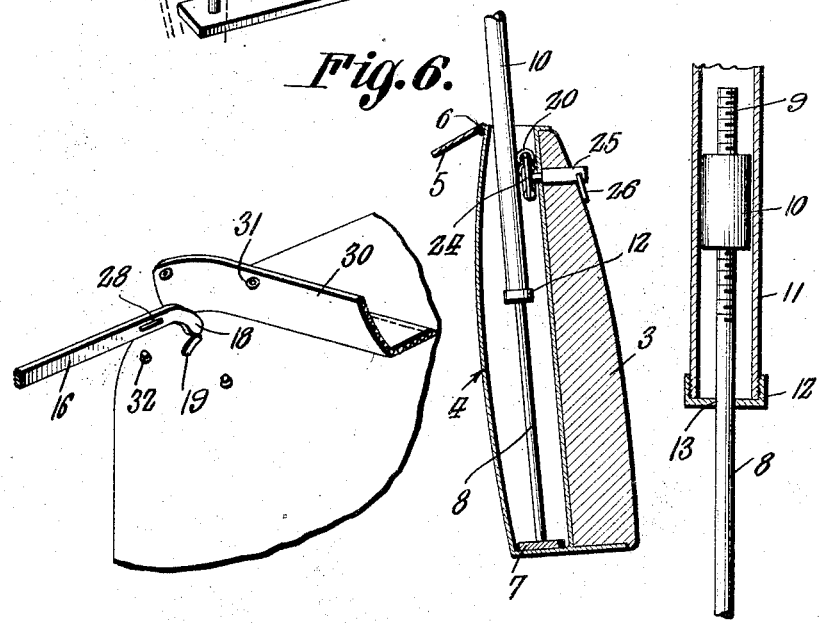
Figure 4 is a perspective view illustrating the manner in which the forward ends of the side members of the rumble seat top frame may be connected with the back of the body of the automobile at the top thereof.
Figure 5 is a detail view partly in section and partly in elevation illustrating the construction of one of the upright side members or standards of the rumble seat top frame.
Figure 6 is a detail vertical sectional view.

It will be observed by reference to Figure 5 that the cylindrical nuts 10 are, in the raised position of the frame structure, spaced somewhat above the respective closure caps 12 so that ample space is provided to permit of elevation of the frame structure, or more broadly, the side upright sections 11 to provide, as above stated for the folding of the side members 16. The cover 5 of the casing may be swung to closed position and any suitable means may be provided for locking it in this position.

The top of the automobile proper includes the usual side guards which are indicated by the numeral 36 and these side guards are connected with the respective ones of the front side covering section 33 of the attachment of the invention by snap fasteners or other suitable means, indicated by the numeral 37 and at their lower edges are connected by similar fasteners 38 to the sides of the body of the automobile so that these side guards may be separated at their rear edges from the front sections 33, prior to folding up of the cover structure embodying the invention, and likewise separated from the sides of the body of the automobile and folded to position beneath the top thereof, which is indicated by the numeral 39, so as to be housed within this top when the top is folded backwardly about the usual swinging frame 40 to the full open position.

It is preferable that the bars 16 be relatively braced by cross bars 40 comprising telescopic sections secured at their outer ends to corresponding ones of the bars 16 and held in positions of adjustment by means of a set screw 41 threaded through an opening in the tubular telescopic section and engaging the other section.

What I claim is:—

1. In an automobile rumble seat top, the combination with the back rest of the rumble seat, of a casing mounted upon the said back rest, a closure for the top of the casing, rods within the casing extending upwardly from the bottom thereof and at the opposite sides thereof, barrels closed at their lower ends and provided in their said ends with openings fitting the rods, the upper portion of each rod being threaded, an interiorly threaded sleeve adjustably fitted onto the threaded portion of each rod and fitting slidably within the respective barrel, whereby the barrels may be vertically adjusted with respect to the rods and braced in their adjustment by the engagement of the sleeves with the barrels, the said barrels constituting the side members of a frame, and a cover of flexible material having a rear portion extending between and connected to the barrels and a portion to extend between the upper ends of the barrels, and above the rumble seat and to the rear side of the top of the automobile, the said cover being foldable to be housed in the casing upon lowering of the barrels into the casing.

2. In an automobile rumble seat top, the combination with the back rest of the rumble seat, of a casing mounted upon the said back rest, a closure for the top of the casing, rods within the casing extending upwardly from the bottom thereof and at the opposite sides thereof, barrels closed at their lower ends and provided in their said ends with openings fitting the rods, the upper portion of each rod being threaded, an interiorly threaded sleeve adjustably fitted onto the threaded portion of each rod and fitting slidably within the respective barrel, whereby the barrels may be vertically adjusted with respect to the rods and braced in their adjustment by the engagement of the sleeves with the barrels, and said barrels constituting the side members of a frame, a cover of flexible material having a rear portion extending between and connected to the barrels and a portion to extend between the upper ends of the barrels, and above the rumble seat and to the rear side of the top of the automobile, the said cover being foldable to be housed in the casing upon lowering of the barrels into the casing, and means for holding the barrels in their elevated position of adjustment, the said means comprising eye members upon the barrels, rods mounted for sliding movement upon one wall of the casing and engageable at their outer ends in the eye members, a stem extending the rear wall of the casing, a knob upon the outer end of the stem whereby the stem may be rotated, and a head mounted upon the stem within the casing, the said rods, at their inner ends, being pivotally connected to the opposite ends of the said head.

3. In an automobile rumble seat top, the combination of the usual top and with the back rest of the automobile seat provided with eyelets, of a casing mounted upon the back of said back rest, vertically adjustable uprights within the casing at opposite sides thereof movable to assume a position extending above the top of the casing, a stem rotatably mounted in a wall of the casing, a head on the inner end of the stem, horizontally movable locking bolts positioned within the casing and having their adjacent ends connected with said head, and means upon the outer end of the stem whereby the same may be rotated to move the locking bolts into engagement with the eyelets of the rumble seat for holding the uprights in extended position.

In testimony whereof I affix my signature.

WILLARD H. ODEN.